Figure 1:
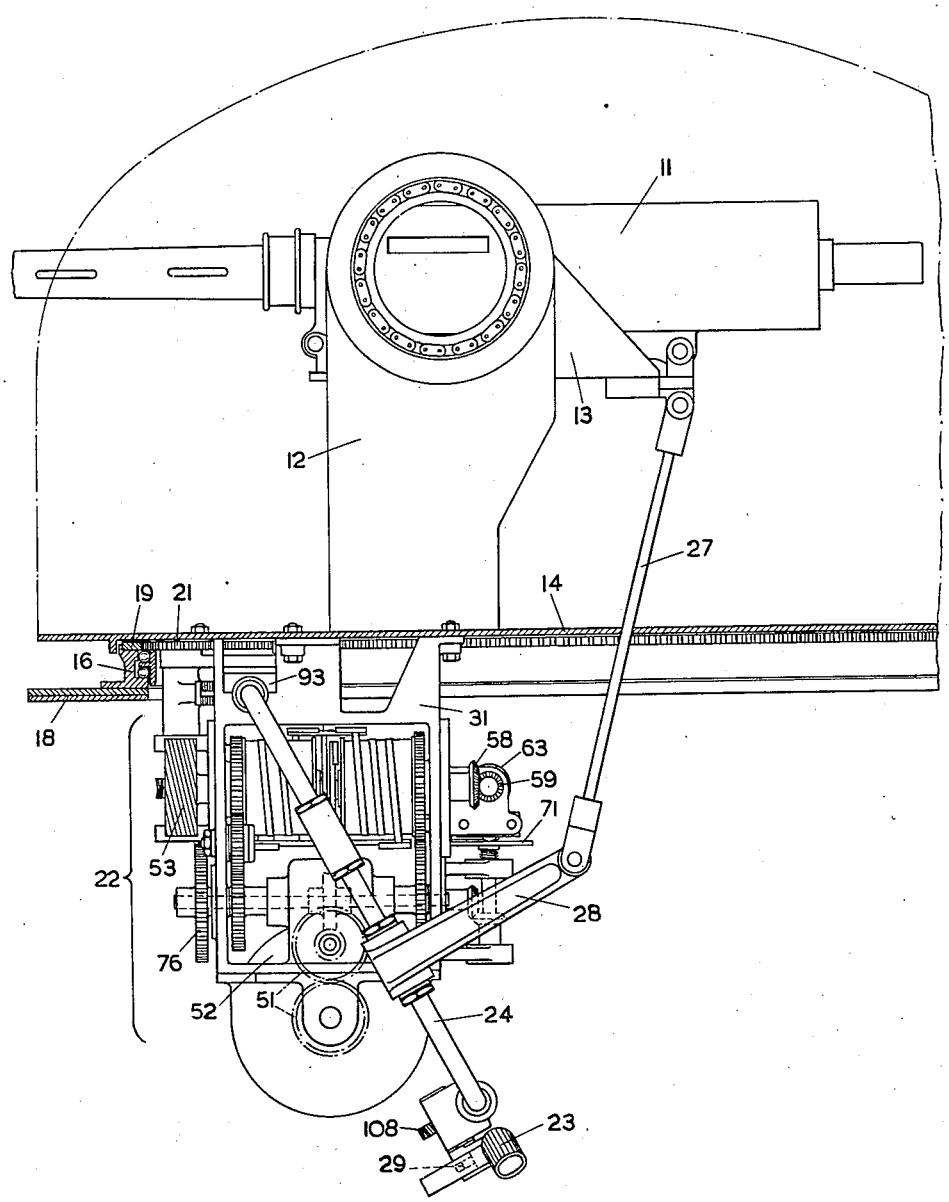

Feb. 27, 1945.  P. B. SCOTT ET AL  2,370,585
GUN TURRET
Filed May 28, 1942  4 Sheets-Sheet 2
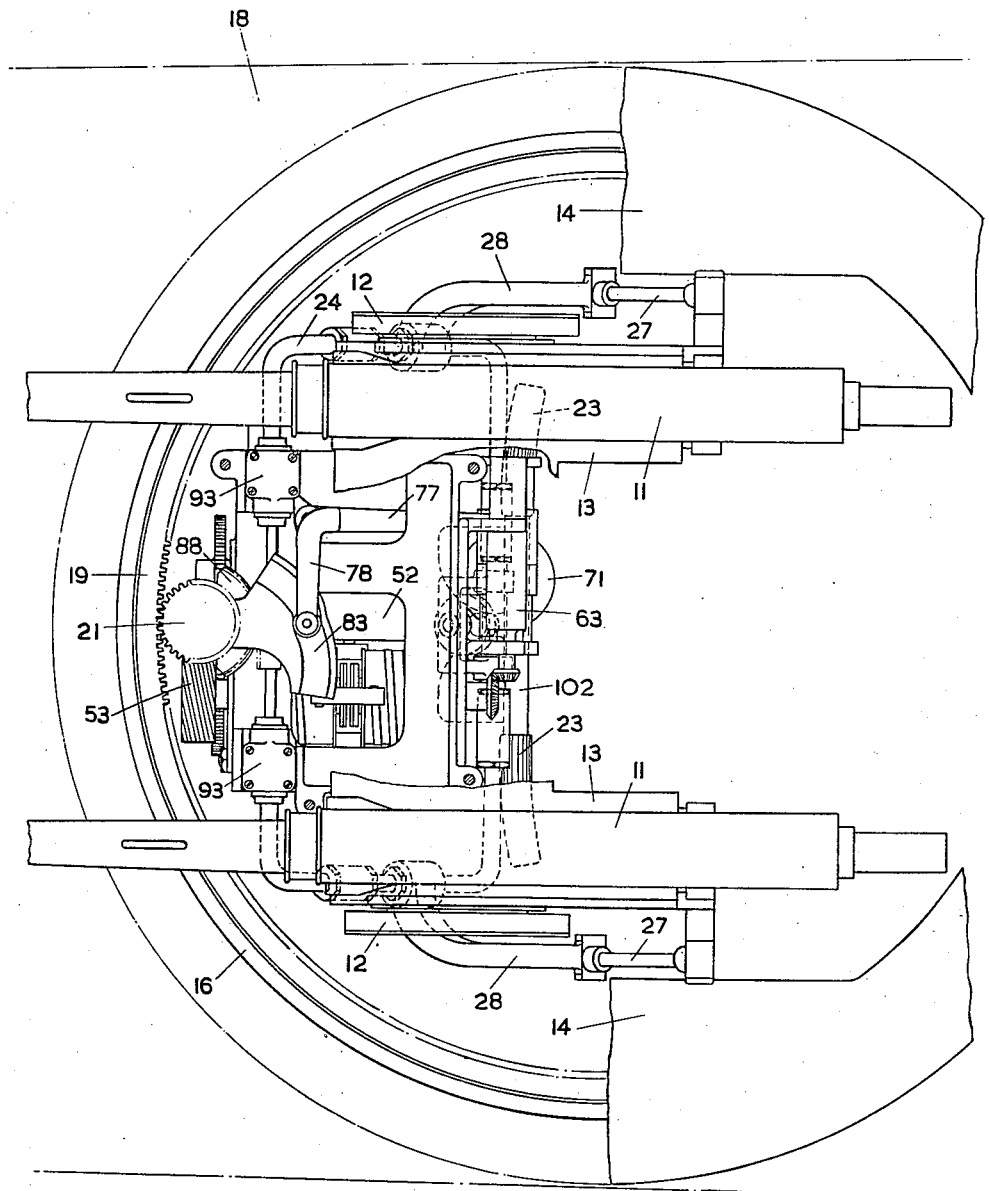
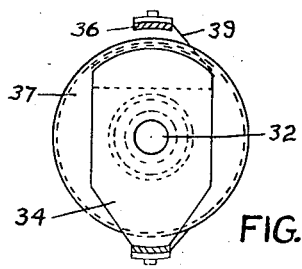
FIG. 2.
FIG. 7
INVENTORS:
P. BODLEY SCOTT.
A. G. ROSE.
S. CURTIS.
BY
ATTORNEYS.

Feb. 27, 1945.   P. B. SCOTT ET AL   2,370,585
GUN TURRET
Filed May 28, 1942   4 Sheets-Sheet 3

INVENTORS:
P. BODLEY SCOTT
A. G. ROSE
S. CURTIS
BY
Munn, Liddy, Glaccum & Kane
ATTORNEYS.

Feb. 27, 1945. P. B. SCOTT ET AL 2,370,585
GUN TURRET
Filed May 28, 1942 4 Sheets-Sheet 4
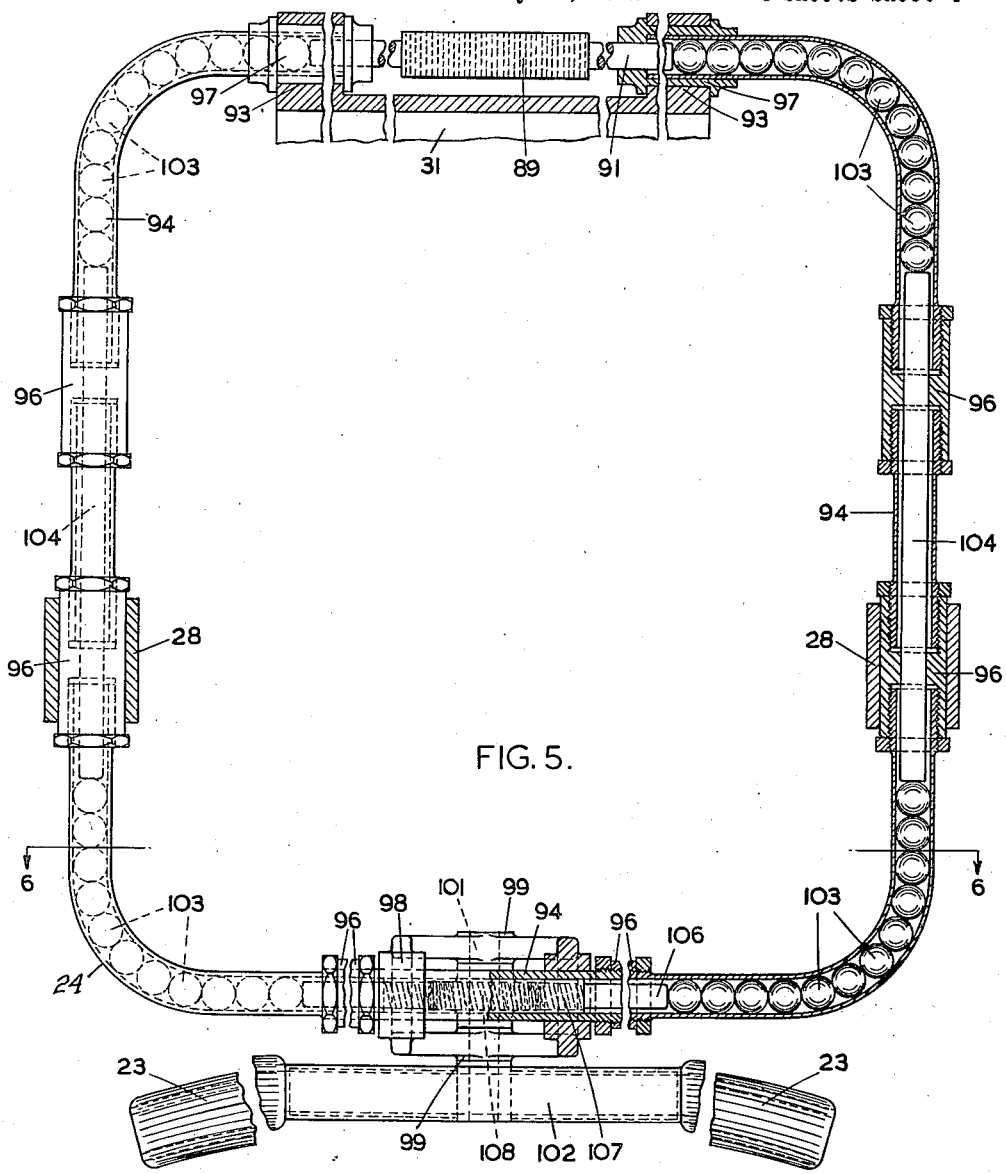
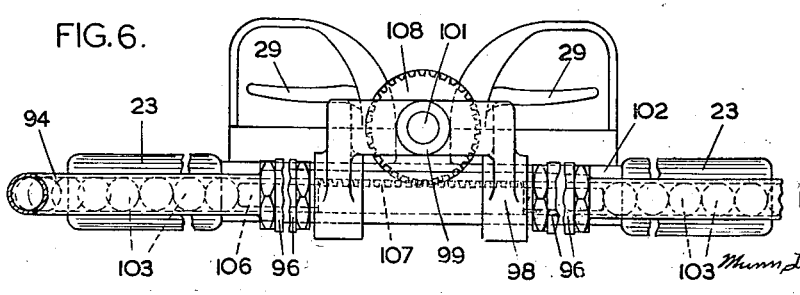
INVENTORS:
P. BODLEY SCOTT.
A. G. ROSE.
S. CURTIS.
BY
Munn, Liddy, Glaccum & Kane
ATTORNEYS.

UNITED STATES PATENT OFFICE 2,370,585

GUN TURRET

Philip Bodley Scott, London, and Alfred German Rose and Sidney Curtis, Gainsborough, England; said Rose and said Curtis assignors to Rose Brothers (Gainsborough) Limited, Gainsborough, England, a British company Application May 28, 1942, Serial No. 444,856
In Great Britain May 8, 1941

12 Claims. (Cl. 74—388)

This invention relates to power driven gun turrets and has for its principal object the provision of an improved driving and controlling mechanism for such apparatus.

The invention is particularly concerned with gun turrets of the type in which a gun-supporting platform is rotatably mounted on a stationary annulus about an axis coincident with that of said annulus and provided with a rotatable driving member arranged to bring about rotation of said platform by engagement with said annulus; and a further object is to provide, in such a gun turret, a driving and controlling mechanism comprising an output shaft arranged to cause rotation of said driving member; an input shaft, a torque-amplifying device connecting the input shaft to the output shaft so that the output shaft exerts a greater torque than that exerted by the input shaft, and a variable speed device adapted to connect the input shaft to a source of power, e. g., an electric motor, the variable speed device being such that the speed of the input shaft can be varied at will from a maximum in one direction to a maximum in the opposite direction.

Further objects of the invention will appear from the following description.

The variable speed device may comprise a friction roller having a driving connection with the input shaft, a driving disc arranged for rotation about an axis at right angles to the axis of the friction roller, a friction member arranged to make rolling contact with the friction roller and the driving disc so as to transmit the drive from the driving disc to the friction roller, the friction member being arranged to slide diametrically across the face of the driving disc in a direction parallel to the axis of the friction roller, and means for sliding the friction member at will from one position to another on the driving disc.

The means for sliding the friction member from one position to another is preferably combined with means for controlling the elevation of the gun or gun assembly mounted on the platform so that the elevation of the guns as well as the rotation of the platform in either direction and at any speed within the range of the variable speed device can be controlled by means of a common controlling member.

Figure 3:
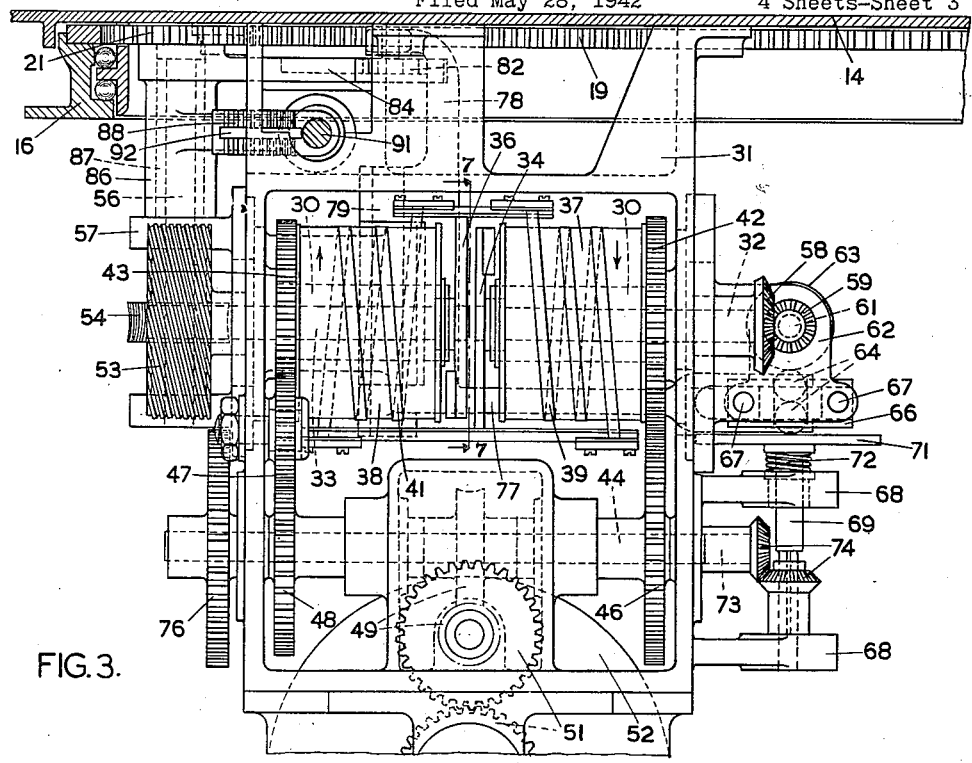
Figure 4:
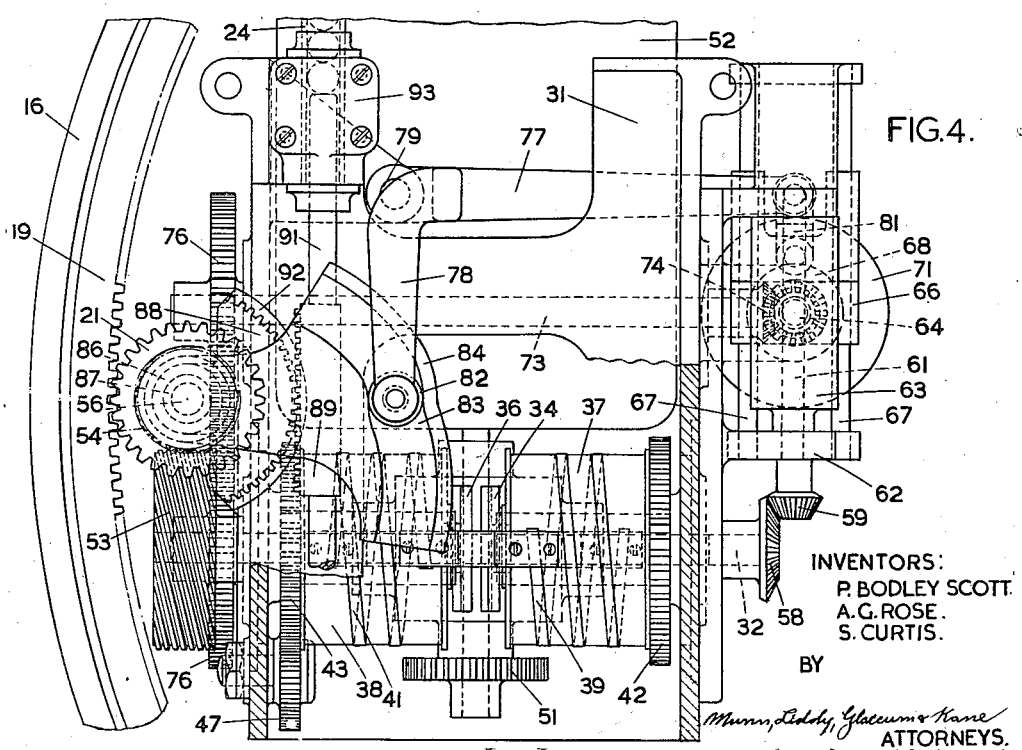

The invention is particularly useful in its application to aircraft, armoured vehicles, or the like, and by way of example, a gun turret according to the invention, for use in aircraft, will now be described in greater detail with reference to the accompanying drawings, in which:

Figure 1 is an elevation of a gun turret constructed in accordance with the invention, Figure 2 is a plan view of the gun turret shown in Figure 1 with certain portions removed for clarity of illustration, Figure 3 is an elevation, drawn to a somewhat larger scale than Figure 1, of the driving mechanism, Figure 4 is a plan view of the apparatus shown in Figure 3, with certain portions removed for clarity of illustration, Figure 5 is a part-sectional elevation of a detail of Figure 1, Figure 6 is a sectional plan view taken on the line 6—6 of Figure 5, and Figure 7 is a sectional view of part of the apparatus shown in Figure 3 taken along the line 7—7 in Figure 3.

Referring particularly to Figures 1 and 2, a pair of machine guns 11 are pivotally mounted for elevational movement in a pair of bearing members 12 by means of a cradle 13 to which the guns 11 are attached. The bearing members 12 are secured to a platform 14 which is rotatably mounted, for movement in azimuth, on a stationary annulus 16 attached to the fuselage 18 in the gunner's cockpit of an aircraft.

Secured to the annulus 16 is an internal gear 19 in driving engagement with which is a pinion 21 forming part of a driving and controlling mechanism, generally indicated by reference numeral 22, attached to the underside of the platform 14.

The rotational movement of the platform 14 is controlled by a pair of hand grips 23 mounted on a controlling member 24 which also controls the elevation of the guns 11 by means of a pair of links 27 attached at one end to the cradle 13 and at the other to a pair of arms 28 secured to the controlling member 24. The training and elevational movements of the guns 11 are thus controlled by the common controlling member 24. A detailed description of the construction and operation of the controlling member 24 and the hand grips 23 appears later in the specification. The guns are fired electrically by triggers 29 attached to the hand grips 23 by known electrical mechanism forming no part of this invention.

The driving and controlling mechanism 22 is shown in greater detail in Figures 3 and 4, and this mechanism will now be described with particular reference to those figures.

The mechanism 22 is carried by a frame 31 secured to the underside of the platform 14. Mounted coaxially in bearing sleeves 30 attached to the frame 31 is an input shaft 32 and an output shaft 33. These shafts have secured to their adjacent ends balanced T-shaped radial arms 34 and 36, respectively. Freely mounted on journals formed by the external surfaces of the sleeves 30 of the shafts 32 and 33 are a pair of friction drums 37 and 38, respectively. Steel tapes 39 and 41 are coiled round the drums 37 and 38, respectively, in the form of right-hand helices, the tape 39 being attached at one end (right-hand end as viewed in Figure 3) to the cross piece of the T-shaped arm 34 and at the other end to the cross piece of the T-shaped arm 36, while the tape 41 is attached at its right-hand end to the cross piece of the T-shaped arm 36 and at its other end to the cross piece of the T-shaped arm 34. The tapes 39 and 41 are assembled on the drums 37 and 38 in such a manner that, when they are stationary, the coils are slightly loose so that the drums may rotate without seizing. It will thus be seen that the input shaft 32 is connected to the output shaft 33 through the medium of the steel tapes 39 and 41.

Attached to the drums 37 and 38 are a pair of gears 42 and 43, respectively, arranged to be driven in opposite directions by a shaft 44 mounted in suitable bearings in the frame 31, the gear 42 engaging a gear 46, attached to the shaft 44 and the gear 43 engaging an intermediate gear 47 which, in turn, engages a further gear 48 attached to the shaft 44. The drums 37 and 38 are arranged to be driven at the same rate of rotation, the direction of rotation of each drum being the same as that in which the input shaft 32 is required to rotate in order to cause the corresponding tape 39 or 41 to tighten on to the drum. The shaft 44 is driven through worm gearing 49 and spur gearing 51 from an electric motor 52.

Secured to the output shaft 33 is a worm 53 engaging a worm wheel 54 attached to a shaft 56 supported in suitable bearings in a bracket 57, attached to the frame 31, the shaft 56 carrying the pinion 21 in engagement with the internal gear 19.

Secured to the input shaft 32 is a bevel gear 58 arranged to engage a bevel pinion 59 secured to a shaft 61 mounted in suitable bearings in a bracket 62 attached to the frame 31. Secured to the shaft 61 is a friction roller 63 arranged to make rolling contact with a friction member in the form of a pair of steel balls 64 housed in a carriage 66 slidably mounted for movement in a direction parallel to the axis of the friction roller 63 on a pair of rods 67 carried by the bracket 62. The lower of the pair of balls 64 is arranged to make rolling contact with a driving disc 71 secured to a shaft 69 rotatably mounted in a pair of bearings 68, carried by the frame 31. The shaft 69 is disposed with its axis at right angles to the axis of the friction roller 63 and is free to move in an axial direction under the influence of a spring 72 arranged between the upper bearing 68 and the underside of the driving disc 71 so as continuously to urge the disc 71, the balls 64 and the friction roller 63 into contact with each other. The shaft 69 is driven by a shaft 73 through a pair of bevel gears 74, of which the one on the shaft 69 is slidably mounted to allow for the axial movement of the shaft 69. The shaft 73 is mounted in suitable bearings in the frame 31 and is driven from the shaft 44 by means of a pair of gears 76.

The slidable mounting of the carriage 66 enables the driving disc 71 to drive the friction roller 63 through the balls 64 at a speed which varies from a maximum in one direction, when the lower ball 64 is in contact with the surface of the disc 71 of largest diameter at one side of the disc, to zero, when the ball is at the centre of the disc, and from zero to a maximum in the opposite direction as the ball moves from the centre of the disc to the surface of the disc of largest diameter at the opposite side of the disc.

The movement of the carriage 66 is brought about by means of a two-armed lever 77, 78, pivoted on the frame 31 at 79, the arm 77 being connected to the carriage 66 by means of a link 81 and the arm 78 carrying a cam roller 82 arranged to engage a cam groove 83 formed in an arm 84 extending from a hub 86 freely mounted on a boss 87 extending from the bracket 57. Extending from the hub 86 is a gear segment 88 arranged to engage a rack 89 formed on a shaft 91 slidably mounted in the controlling member 24, the segment 88 and rack 89 being grooved to accommodate a key 92 inserted in the segment 88 so as to maintain the teeth in proper engagement.

The controlling member 24 is pivotally mounted in bearings 93 formed in the frame 31 and, as will be seen from Figures 5 and 6, consists generally of an outer casing enclosing a composite flexible shaft. The outer casing consists of a tubular member 94 provided with couplings 96 for assembly and adjustment purposes. The tubular member 94 is provided at its upper end with journal members 97 arranged to be housed in the bearings 93 and there is attached to the central portion of its lower end a bracket 98 formed with bearings 99 for the reception of a shaft 101 to the lower end of which is attached a cross bar 102 carrying the hand grips 23. The composite flexible shaft enclosed in the tubular member 94 consists of the shaft 91, a series of balls 103, spacing rods 104 and a shaft 106. The shaft 106 is formed with a rack 107 arranged to engage a pinion 108 attached to the shaft 101. It will thus be seen that, as the shaft 101 is turned by means of the hand grips 23, the pinion 108 causes the shaft 106 to move longitudinally within the tubular member 94 in one direction or the other, depending on the direction of movement of the hand grips 23, this motion being transmitted to the shaft 91 through the balls 103 and the rods 104. The movement of the shaft 91 causes the rack 89 to turn the gear segment 88 and the arm 84 about the axis of the boss 87, thus causing the two-armed lever 77, 78 to pivot and operate the carriage 66 to vary the motion transmitted to the friction roller 63 by the driving disc 71.

The speed of rotation of the platform 14 can thus be varied from zero to a maximum in either direction by movement of the hand grips 23, while at the same time the elevation of the guns 11 is controlled by pivotal movement of the tubular member 94 in the bearings 93.

Referring again to Figures 3 and 4, it will be seen that the transmission of the drive from one or the other of the drums 37 and 38 to the pinion 21 is controlled by the input shaft 32. Thus, it will be seen that rotation of the input shaft 32 in either direction causes the T-shaped arm 34 to tighten one of the tapes 39 or 41, viz., the one associated with the drum rotating in the same direction as that in which the input shaft is for the time being rotating, on to its drum which thereupon drives the tape by frictional contact and causes the tape to drag the T-shaped arm 36 around the axis of the drum thus transmitting the drive from the drum to the output shaft 33. At the same time the other tape is caused to slacken so that its drum is for the time being inoperative. The rate of rotation of the drums 37 and 38 is slightly greater than the maximum rate of rotation of the input shaft.

It will be seen that the torque to be applied to the input shaft in order to cause the tape to tighten on to the rotating drum is very small as compared with the torque that can be transmitted by the frictional contact between the drum and the tape.

The drums 37 and 38 with their associated gearing and the tapes 39 and 41 thus constitute a torque-amplifying device which enables the gun turret to be rotated through the medium of the relatively light friction drive of the driving disc 71, thus considerably facilitating the control and operation of the gun turret as a whole as well as simplifying the construction of its driving mechanism.

In operation, the motor 52 is switched on when it is required to use the guns, and the gunner manipulates the turret by means of the hand grips 23. Thus, by turning the hand grips 23 about the axis of the shaft 101 in either direction, the composite flexible shaft within the controlling member 24 causes the carriage 66 to move diametrically across the face of the driving disc 71, thus transmitting the drive from the disc 71 to the friction roller 63 at a speed varying from zero to a maximum in either direction depending on the direction of movement of the hand grips 23. The gearing is so arranged that clockwise movement of the hand grips 23 about the axis of the shaft 101 brings about clockwise movement of the platform 14, and vice versa. The motion of the friction roller 63 is transmitted through the torque-amplifying device to the driving pinion 21 in the manner described above, the driving pinion in turn causing the gun-supporting platform 14 to pivot about the axis of the annulus 16. The training movement of the guns 11 can, therefore, be brought about at a varying speed by a simple pivotal movement of the hand grips 23. At the same time, elevational movement of the guns is brought about by pivoting the controlling member 24 in its bearings 93 by means of the hand grips 23, the movement of the controlling member 24 being transferred to the guns 11 through the arms 28 and the links 27.

It will be understood that many modifications of the apparatus described above may be made within the scope of the invention. For instance, other forms of torque-amplifying device may be employed.

We claim:

1. In a gun turret of the type in which a gun-supporting platform is rotatably mounted on a stationary annulus about an axis coincident with that of said annulus and provided with a rotatable driving member arranged to bring about rotation of said platform by engagement with said annulus, a driving and controlling mechanism comprising an output shaft in driving connection with said driving pinion, an input shaft, a torque-amplifying device connecting the input shaft to the output shaft so that the output shaft exerts a greater torque than that exerted by the input shaft, a friction roller in driving connection with the input shaft; a driving disc, means for rotating said disc about an axis at right angles to the axis of the friction roller; a friction member arranged to make rolling contact with the friction roller and the driving disc, so as to transmit the drive from the driving disc to the friction roller; means for urging the driving disc into contact with the friction member; said friction member being arranged to slide diametrically across the face of the driving disc in a direction parallel to the axis of the friction roller; and means for sliding the friction member at will from one position to another on the driving disc so as to vary the rate of rotation of the friction roller from a maximum in one direction to a maximum in the opposite direction.

2. In a gun turret of the type in which a gun-supporting platform is rotatably mounted on a stationary toothed annulus about an axis coincident with that of said annulus and provided with a driving pinion arranged to bring about rotation of said platform by engagement with the teeth of said annulus; a driving and controlling mechanism comprising an output shaft in driving connection with said driving pinion, an input shaft, a torque-amplifying device connecting the input shaft to the output shaft so that the output shaft exerts a greater torque than that exerted by the input shaft, a friction roller in driving connection with the input shaft, a driving disc, means for rotating said disc about an axis at right angles to the axis of the friction roller; a friction member arranged to make rolling contact with the friction roller and the driving disc, so as to transmit the drive from the driving disc to the friction roller, means for urging the driving disc into contact with the friction member; said friction member being arranged to slide diametrically across the face of the driving disc in a direction parallel to the axis of the friction roller, and means for sliding the friction member at will from one position to another on the driving disc so as to vary the rate of rotation of the friction roller from a maximum in one direction to a maximum in the opposite direction.

3. In a gun turret of the type in which a gun-supporting platform is rotatably mounted on a stationary toothed annulus about an axis coincident with that of said annulus and provided with a driving pinion arranged to bring about rotation of said platform by engagement with the teeth of said annulus; a driving an controlling mechanism comprising an output shaft in driving connection with said driving pinion, an input shaft, a pair of friction drums freely mounted for rotation one about each of the axes of said shafts, means for rotating the friction drums about said axes at the same rate in opposite directions, a pair of radial arms secured one to each of said shafts, a pair of friction coils freely disposed one around each of the friction drums, the ends of each coil being attached one to each of said radial arms, the direction of rotation of each of the friction drums being the same as that in which the input shaft is required to rotate in order to tighten the corresponding friction coil on the drum, a friction roller in driving connection with the input shaft, a driving disc, means for rotating said disc about an axis at right angles to the axis of the friction roller; a friction member arranged to make rolling contact with the friction roller and the driving disc, so as to transmit the drive from the driving disc to the friction roller, means for urging the driving disc into contact with the friction member, said friction member being arranged to slide diametrically across the face of the driving disc in a direction parallel to the axis of the friction roller, and means for sliding the friction member at will from one position to another on the driving disc so as to vary the rate of rotation of the friction roller from a maximum in one direction to a maximum in the opposite direction.

4. Apparatus according to claim 2, wherein the friction member comprises a pair of balls in contact with each other, one of said balls engaging the friction roller and the other the driving disc.

5. Apparatus according to claim 3, wherein the friction member comprises a pair of balls in contact with each other, one of said balls engaging the friction roller and the other the driving disc.

6. Apparatus according to claim 2, wherein the means for sliding the friction member comprises a controlling member consisting of an outer casing, an inner composite flexible shaft and rack and pinion mechanism for bringing about longitudinal movement of said flexible shaft within the outer casing and transmitting such movement to the friction member.

7. Apparatus according to claim 4, wherein the means for sliding the friction member comprises a controlling member consisting of an outer casing, an inner composite flexible shaft and rack and pinion mechanism for bringing about longitudinal movement of said flexible shaft within the outer casing and transmitting such movement to the friction member.

8. In a gun turret of the type in which a gun-supporting platform is rotatably mounted on a stationary toothed annulus about an axis coincident with that of said annulus and provided with a driving pinion arranged to bring about rotation of said platform by engagement with the teeth of said annulus, a driving and controlling mechanism comprising an output shaft in driving connection with said driving pinion, an input shaft, a torque-amplifying device connecting the input shaft to the output shaft so that the output shaft exerts a greater torque than that exerted by the input shaft, a friction roller in driving connection with the input shaft, a driving disc, means for rotating said disc about an axis at right angles to the axis of the friction roller, a friction member arranged to make rolling contact with the friction roller and the driving disc, so as to transmit the drive from the driving disc to the friction roller, means for urging the driving disc into contact with the friction member, said friction member being arranged to slide diametrically across the face of the driving disc in a direction parallel to the axis of the friction roller, and means for sliding the friction member at will from one position to another on the driving disc so as to vary the rate of rotation of the friction roller from a maximum in one direction to a maximum in the opposite direction, said friction member including a pair of balls in contact with each other, one of said balls engaging the friction roller and the other the driving disc, means for urging the driving disc into contact with the friction member, said friction member being arranged to slide diametrically across the face of the driving disc in a direction parallel to the axis of the friction roller, and means for sliding the friction member at will from one position to another on the driving disc so as to vary the rate of rotation of the friction roller from a maximum in one direction to a maximum in the opposite direction, said means for sliding the friction member including a controlling member consisting of an outer casing, an inner composite flexible shaft and rack and pinion mechanism for bringing about longitudinal movement of said flexible shaft within the outer casing and transmitting such movement to the friction member.

9. In a gun turret of the type in which a gun-supporting platform is rotatably mounted on a stationary toothed annulus about an axis coincident with that of said annulus and provided with a driving pinion arranged to bring about rotation of said platform by engagement with the teeth of said annulus, a driving and controlling mechanism comprising an output shaft in driving connection with said driving pinion, an input shaft, a torque-amplifying device connecting the input shaft to the output shaft so that the output shaft exerts a greater torque than that exerted by the input shaft, a friction roller in driving connection with the input shaft, a driving disc, means for rotating said disc about an axis at right angles to the axis of the friction roller, a friction member arranged to make rolling contact with the friction roller and the driving disc, so as to transmit the drive from the driving disc to the friction roller, means for urging the driving disc into contact with the friction member, said friction member being arranged to slide diametrically across the face of the driving disc in a direction parallel to the axis of the friction roller, and means including a pivoted cam for sliding the friction member at will from one position to another on the driving disc so as to vary the rate of rotation of the friction roller from a maximum in one direction to a maximum in the opposite direction.

10. In a gun turret of the type in which a gun-supporting platform is rotatably mounted on a stationary toothed annulus about an axis coincident with that of said annulus and provided with a driving pinion arranged to bring about rotation of said platform by engagement with the teeth of said annulus, a driving and controlling mechanism comprising an output shaft in driving connection with said driving pinion, an input shaft, a torque-amplifying device connecting the input shaft to the output shaft so that the output shaft exerts a greater torque than that exerted by the input shaft, a friction roller in driving connection with the input shaft, a driving disc, means for rotating said disc about an axis at right angles to the axis of the friction roller, a friction member arranged to make rolling contact with the friction roller and the driving disc, so as to transmit the drive from the driving disc to the friction roller, means for urging the driving disc into contact with the friction member, said friction member being arranged to slide diametrically across the face of the driving disc in a direction parallel to the axis of the friction roller, and means for sliding the friction member at will from one position to another on the driving disc so as to vary the rate of rotation of the friction roller from a maximum in one direction to a maximum in the opposite direction, said means for sliding the friction member including a controlling member consisting of an outer casing, an inner composite flexible shaft, rack and pinion mechanism for bringing about longitudinal movement of said flexible shaft within the outer casing, and a pivoted cam co-operating with further rack and pinion mechanism for transmitting such movement to the friction member.

11. In a gun turret of the type in which a gun-supporting platform is rotatably mounted on a stationary toothed annulus about an axis coincident with that of said annulus and provided with a driving pinion arranged to bring about rotation of said platform by engagement with the teeth of said annulus, a driving and controlling mechanism comprising an output shaft in driving connection with said driving pinion, an input shaft, a pair of friction drums freely mounted for rotation one about each of the axes of said shafts, means for rotating the friction drums about said axes at the same rate in opposite directions, a pair of radial arms secured one to each of said shafts, a pair of friction coils freely disposed one around each of the friction drums, the ends of each coil being attached one to each of said radial arms, the direction of rotation of each of the friction drums being the same as that in which the input shaft is required to rotate in order to tighten the corresponding friction coil on the drum, a friction roller in driving connection with the input shaft, a driving disc, means for rotating said disc about an axis at right angles to the axis of the friction roller, a friction member arranged to make rolling contact with the friction roller and the driving disc, so as to transmit the drive from the driving disc to the friction roller, means for urging the driving disc into contact with the friction member, said friction member being arranged to slide diametrically across the face of the driving disc in a direction parallel to the axis of the friction roller, and means including a pivoted cam for sliding the friction member at will from one position to another on the driving disc so as to vary the rate of rotation of the friction roller from a maximum in one direction to a maximum in the opposite direction.

12. In a gun turret of the type in which a gun-supporting platform is rotatably mounted on a stationary toothed annulus about an axis coincident with that of said annulus and provided with a driving pinion arranged to bring about rotation of said platform by engagement with the teeth of said annulus, a driving and controlling mechanism comprising an output shaft in driving connection with said driving pinion, an input shaft, a pair of friction drums freely mounted for rotation one about each of the axes of said shafts, means for rotating the friction drums about said axes at the same rate in opposite directions, a pair of radial arms secured one to each of said shafts, a pair of friction coils freely disposed one around each of the friction drums, the ends of each coil being attached one to each of said radial arms, the direction of rotation of each of the friction drums being the same as that in which the input shaft is required to rotate in order to tighten the corresponding friction coil on the drum, a friction roller in driving connection with the input shaft, a driving disc, means for rotating said disc about an axis at right angles to the axis of the friction roller, a friction member arranged to make rolling contact with the friction roller and the driving disc, so as to transmit the drive from the driving disc to the friction roller, means for urging the driving disc into contact with the friction member, said friction member being arranged to slide diametrically across the face of the driving disc in a direction parallel to the axis of the friction roller, and means for sliding the friction member at will from one position to another on the driving disc so as to vary the rate of rotation of the friction roller from a maximum in one direction to a maximum in the opposite direction, said means for sliding the friction member including a controlling member consisting of an outer casing, an inner composite flexible shaft, rack and pinion mechanism for bringing about longitudinal movement of said flexible shaft within the outer casing, and a pivoted cam cooperating with further rack and pinion mechanism for transmitting such movement to the friction member.

PHILIP BODLEY SCOTT.
ALFRED GERMAN ROSE.
SIDNEY CURTIS.